United States Patent Office

Re. 27,151
Reissued June 29, 1971

27,151
CARBOXY-HYDROXY-CONTAINING COPOLYMERS

Darrell D. Hicks, Louisville, Ky., assignor to Celanese Coatings Company, New York, N.Y.

No Drawing. Original No. 3,375,227, dated Mar. 26, 1968, Ser. No. 544,083, Apr. 21, 1966, which is a continuation-in-part of Ser. No. 364,274, May 1, 1964. Application for reissue Mar. 24, 1970, Ser. No. 22,409
The portion of the term of the patent subsequent to Oct. 3, 1978, has been disclaimed
Int. Cl. C08f *15/40*
U.S. Cl. 260—47UA 2 Claims

Matter enclosed in heavy brackets [ ] appears in the original patent but forms no part of this reissue specification; matter printed in italics indicates the additions made by reissue.

ABSTRACT OF THE DISCLOSURE

A copolymer of an unsaturated aliphatic acid having only one carboxy group, at least one different ethylenically unsaturated monomer and a beta-hydroxyalkyl ester of an unsaturated aliphatic acid having only one carboxyl group, said copolymer being useful in coating compositions.

This invention is a continuation-in-part of my copending application Ser. No. 364,274, filed May 1, 1964 now abandoned and application Ser. No. 117,830, filed June 19, 1961, now abandoned and application Ser. No. 593,-340, filed June 25, 1956, now U.S. Patent No. 3,002,959.

This invention relates to carboxy-hydroxy copolymers which are eminently suitable as crosslinking agents with diisocyanates, epoxides and aminoplast resins. More particularly, this invention relates to such copolymers having an acid value of from about 1 to 50.

The carboxy-hydroxy copolymers of this invention are esters of a copolymer of a short chain alpha-beta unsaturated mono-carboxylic acid and a vinyl monomer having a single active terminal vinyl group, wherein the ester substituents are formed by means of a monoepoxide. The reactions involved in the preparation of these carboxy-hydroxy copolymers are the carboxy-epoxy reactions between the carboxyl group of the alpha-beta unsaturated acid and the monoepoxide, whereby the hydroxy ester is formed, and the copolymerization reaction wherein the unsaturated mono-carboxylic acid, or its ester, and the vinyl monomer copolymerize to form the copolymer.

In the reaction of a carboxyl group with an epoxide group, two monohydroxyester substituents are possible. Each portion of the ester substituent derived from the monoepoxide, that is, the alcoholic portion of the ester substituent, contains one alcoholic hydroxyl group on a carbon atom either alpha or beta to a carbonyl carbon atom. Hence, in the copolymers resulting from the process of this invention, each hydroxyl in the molecule is attached to a carbon atom linked to a carbonyl group through the oxygen atom or to a carbon atom adjacent to a carbon atom linked to a carbonyl group through the oxygen atom of the ester linkage.

In preparing the copolymers of this invention, one method is to esterify the alpha-beta unsaturated monocarboxylic acid to form the hydroxy-ester and then to copolymerize this resulting hydroxy-ester with the vinyl monomer. Another method is to copolymerize the alpha-beta unsaturated monocarboxylic acid with the vinyl monomer and then to esterify the copolymer thus formed using a monoepoxide to form the carboxy-hydroxy copolymer. A sufficient amount of the acid is used so that the acid value of the resulting copolymer is at least about 1. The upper limit for the acid number is not critical and may be as high as 40 or even 50. Advantageously, the acid value is between about 12 and 20.

In accordance with Ser. No. 593,340, now U.S. Patent No. 3,002,959, however, it was discovered that the hydroxy-ester and the copolymer can be made by concomitant reactions, through the combination of the three reactants and the use of two catalysts, a carboxy-epoxy catalyst and a vinyl polymerization catalyst. Thus, by the use of two catalysts, a carboxy-hydroxy-containing copolymer is prepared by copolymerizing an alpha-beta unsaturated monocarboxylic acid with a monovinyl compound while concomitantly the alpha-beta unsaturated acid is reacted with a monoepoxide to form a hydroxy-ester. More specifically, a styrene-hydroxy propyl acrylate or vinyl toluene-hydroxy propyl methacrylate copolymer is prepared by combining acrylic acid or methacrylic acid, propylene oxide, and styrene or vinyl toluene, and the esterified copolymer-containing carboxyl groups is readily formed in the presence of an amine, an amine salt, or a salt of a quaternary ammonium hydroxide, etc., as a catalyst for the carboxy-epoxy reaction and a peroxide or hydroperoxide, etc., as a catalyst for the copolymerization reaction. Again, sufficient acid is employed so that the acid value of the resulting copolymer is between about 1 to 50.

In preparing the carboxy-hydroxy copolymers following the practice of Serial No. 593,340, now U.S. Patent No. 3,002,959 the three reactants and the two catalysts are combined in the presence of a solvent which is inert insofar as the reactions are concerned, and refluxed until the carboxy-epoxy esterification and concomitant polymerization reactions are substantially complete, as indicated by a relatively constant acid value, and a solids content approaching the theoretical for complete conversion. The reflux period generally is from four to ten hours. The acid value continues to decrease until the reaction is substantially complete, whereupon the acid value remains substantially constant. The reflux temperature is dependent upon the boiling point of the lowest boiling substituent, and the amount of the substituent present in the mixture. Thus, when propylene oxide, along with a higher boiling solvent, is used, the reflux temperature is generally 75° C. to 90° C. In general, the reaction temperature is between 60° C. and the reflux temperature of the mixture. It is noted that this invention inovlves the use of two catalysts, where one catalyst is an inhibitor of the reaction promoted by the other. Amines, the example, are inhibitors of vinyl copolymerization reactions. Accordingly, for maximum production of ester groups, as well as ultimate conversion to copolymer, it is desirable that the two catalysts be in balance. If too much amine or similar catalyst is used , the acid value will reach a leveling-off point, but the conversion to copolymer will be low. If too much peroxide or other polymerization catalyst is employed, conversion to polymer is satisfactory but the leveling off of the acid value, indicating extent of esterification of carboxyl groups, will not be reached to the proper degree. In general, the amount of peroxide is one to four percent, depending upon the monomers, and the carboxy-epoxy catalyst is in the range of 0.5 to 6 percent by weight based on the reactants, depending upon its basicity. Weakly basic catalysts such as tertiary amines are used in quantities of from three or four to six percent, while less of the stronger bases such as primary amine is used within the range.

Thus, as claimed in Serial No. 593,340, now U.S. Patent No. 3,002,959, a one-step process was provided for preparing carboxy-hydroxy copolymers wherein the aliphatic acid and the monoepoxide are reacted using amine or a quaternary ammonium compound as a catalyst, while the unsaturated aliphatic acid is concomitantly copolymerized with the ethylenically unsaturated monomer. In the preparation of these carboxy-hydroxy copolymers for maximum yields, it is also desirable to maintain a proper proportion of reactants to solvent. When too much solvent is used, the carboxy-epoxy reaction proceeds normally but there is a low conversion to polymer. If too little solvent is employed, production of ester groups from the carboxyl-epoxide reaction is low whereas the polymerization reaction proceeds without difficulty. For most purposes, it is desirable to employ the solvent in a ratio of the combined three reactants to solvent of from 1:0.4 to 1:1.

Among the monoepoxides suitable for the preparation of ester groups in accordance with this invention are substituted alkyl compounds, as well as ethers and esters. One class of carboxy-hydroxy copolymers results from the reaction of the carboxyl groups of the alpha-beta unsaturated acid, with a saturated hydrocarbon, ether, ester, etc., having a three-membered epoxide ring, said epoxy compound being free of other reactive groups. Examples are oxirane, or ethylene oxide, as well as saturated alkyl oxiranes, for instance, methyl oxirane, or propylene oxide, butene-2-oxide, etc. Among others are esters and ethers containing only one three-membered epoxide substituent, each free of other reactive groups. Examples are phenyl glycidyl ether, isopropyl glycidyl ether, butyl glycidyl ether, glycidyl benzoate, glycidyl acetate, etc.

Valuable alpha-beta unsaturated acids for use in the preparation of the copolymer are short chain alpha-beta unsaturated aliphatic monocarboxylic acids such as acrylic acid, methacrylic acid and crotonic acid. By short chain alpha-beta unsaturated acids are intended those of not more than twelve carbon atoms. Included are half-esters of maleic and fumaric acids formed with saturated alcohols of from one to ten carbon atoms.

Copolymerized with the alpha-beta unsaturated acid, or the hydroxy ester of the alpha-beta unsaturated acid, is a monomer copolymerizable therewith, containing a single active $CH_2=C<$ group, including a terminal methylene group, which undergoes addition polymerization to produce linear polymers, in other words, a vinyl compound. Particularly important are vinyl aromatic compounds, for instance, styrene, vinyl toluene, alpha-methyl styrene, the halostyrenes, etc., having a single vinyl group and free of other substituents capable of reacting with an unsaturated acid, i.e., a monofunctional vinyl aromatic compound. Also valuable are saturated alcohol esters of acrylic, methacrylic and crotonic acids. Examples of monofunctional vinyl aromatic monomers are isopropenyl toluene, the various dialkyl styrenes, ortho-, meta- and para-chloro styrene, bromo styrenes, fluoro styrenes, cyano styrenes, vinyl naphthalene, the various alpha-substituted styrenes, e.g., alpha-methyl styrenes, alpha-methyl para-methyl styrenes, as well as various di-, tri- and tetra-chloro, bromo and fluoro styrenes. Acrylic, methacrylic and crotonic esters of saturated alcohols include the methyl, ethyl, propyl, isopropyl, n-butyl, isobutyl, (sec)butyl, (tert)butyl, amyl, hexyl, heptyl, octyl, decyl, dodecyl, etc. esters of acrylic, methacrylic, and crotonic acids. Thus, preferred vinyl monomers include alpha-beta unsaturated monocarboxylic acid esters of saturated monohydric alcohols, the acids having not more than four carbon atoms and the alcohols having not more than twenty carbon atoms and monofunctional vinyl aromatic compounds.

Other known vinyl monomers can, of course, be used in the preparation of the carboxyl-containing vinyl copolymer. Desirable monomers include vinyl aliphatic cyanides of not more than four carbon atoms, for example, acrylonitrile and methacrylonitrile, as well as monovinyl ethers, e.g., ethyl vinyl ether, ethyl methallyl ether, vinyl butyl ether, methyl vinyl ether and others of not over twenty carbon atoms. Included also are unsaturated monohydric alcohol esters of saturated monobasic acids wherein the alcohols contain a single vinyl group and the acids have not more than twenty carbon atoms, for instance, vinyl acetate, vinyl stearate, and the allyl, methallyl, and crotyl esters of propionic, butyric and other acids. Not only the vinyl monomers themselves, but mixtures of the vinyl monomers can be copolymerized with the alpha-beta unsaturated acids to form the carboxyl-containing vinyl copolymer. A particularly desirable mixture is a combination of an acrylic or methacrylic ester with styrene or vinyl toluene.

In the preparation of ester groups, any of the catalysts which are activators for epoxide-carboxyl reactions can be used. These epoxy-carboxy catalysts are generally basic materials and are well known in the art, for example, amines, amine salts, quaternary ammonium hydroxides and quaternary ammonium salts, such as dimethylaminomethyl phenol, benzyl trimethyl ammonium hydroxide, benzyl trimethyl ammonium chloride etc. Particularly useful for this purpose are the quaternary ammonium hydroxides and halides.

Included among catalysts for promoting the polymerization of the alpha-beta unsaturated monocarboxylic acid with the vinyl monomer are hydrogen peroxide, various organic peroxides, for example, ascaridol, acetyl, and benzoyl peroxide, dibutyryl and dilauryl peroxides, caprylyl peroxide, as well as partially oxidized aldehydes which can contain peroxide, ureaperoxide, succinic acid peroxide, and the like. Other peroxides are fatty acid peroxides, such as coconut oil peroxides, stearic peroxide, lauric peroxide, and oleic peroxide. Also intended are alcoholic peroxides such as tertiary butyl hydroperoxides and other peroxides such as cumene hydroperoxide, tertiary butyl perbenzoate, hydroxyheptyl peroxide and chlorobenzoyl peroxide. Other free radical promoting catalysts such as azobisisobutyronitrile can also be used.

By combining the three reactants according to Serial No. 593,340, now Patent No. 3,002,959, and application Serial No. 117,830, filed June 19, 1961, a wide variety of carboxy-hydroxy copolymers can be prepared depending entirely upon the ratio of vinyl monomer to the other two reactants. Carboxy-hydroxy copolymers particularly useful in the coatings field are generally prepared so that the carboxy-hydroxy copolymer contains from five to seventy-five percent by weight, based on the copolymer of the hydroxy ester of the alpha-beta unsaturated monocarboxylic acid. Hence, the remaining ninety-five to twenty-five percent of the copolymer is vinyl compound. The maximum amount of monoepoxide will, generally, of course, be that equivalent to less than the unsaturated monocarboxylic acid, such that the acid value of the resulting copolymer will be about 1 to 50. In general, copolymers have an average of from four to one hundred hydroxyl groups per molecule, and weights per hydroxyl group of not less than 116. It has been noted that in the incorporation of the carboxy-hydroxy copolymers, a solvent is employed as the reaction medium. Desirable solvents for this purpose are ketones, Cellosolves and aromatic hydrocarbons as well as combinations of aromatic hydrocarbons with a ketone or Cellosolve, for example, acetone, methyl ethyl ketone, methyl isobutyl ketone, diisobutyl ketone, Cellosolve, Cellosolve acetate, and mixtures of ketones and Cellosolves with xylene, toluene, benzene, etc.

As pointed out above, the carboxy-hydroxy copolymers of this invention are useful in the coatings industry and are eminently suitable as crosslinking agents with diisocyanates, epoxides, and aminoplast resins.

The presence of the carboxyl groups in the copolymer prepared according to the present invention are of particular importance in that these carboxyl groups impart to the copolymer a unique compatibility with the crosslinking agent, such as an alkylated aminoplast resin, and consequently these copolymers produce a crosslinked product having a very high gloss. On the other hand, the absence of the carboxyl groups results in the production of crosslinked products having substantially less gloss.

The presence of the carboxyl groups in the copolymer of this invention is also of particular significance in imparting stability to the copolymer when the copolymer is present in an uncured mixture containing the crosslinking agent, such as a diisocyanate. This stability feature is important because these copolymers are generally sold in admixture with the crosslinking agent. It is therefore of paramount importance that no substantial crosslinking reaction take place between the copolymer and the crosslinking agent during the shipping and storage periods.

The consumer who purchases the admixture and who coats various articles with it, usually follows a procedure whereby he fills a dip tank with the admixture and then dips the articles in the tank. He then removes the coated articles from the tank and then bakes them. During the baking period, a self-crosslinking reaction takes place between the copolymer and the crosslinking agent. Since it is customary to simply replenish the contents of the dip tank as they become depleted, it is apparent that portions of any particular admixture batch may remain in the dip tank for extended periods of time. It is again of paramount importance that no substantial crosslinking reaction take place between the copolymers and the crosslinking agent during the period of time in which the admixture is in the dip tank.

It has been found that when a crosslinking agent, such as an alkylated aminoplast resin, is employed, and the acid value of the copolymers produced according to the present invention approaches zero, an acid catalyst must be added to the copolymer-crosslinking agent mixture in order to produce a self-crosslinking mixture. This mixture, however, is not satisfactorily stable. The copolymers of this invention require no additional acid catalyst and yet they are surprisingly stable when present in an uncured mixture containing the crosslinking agent. If the stability of the mixture is not of primary concern, small amounts of acid catalyst may be added to the mixture in some instances.

For a further understanding of the invention, reference is made to the following specific examples, the viscosities given being Gardner-Holdt viscosities run at 25° C. These examples are intended to be illustrative of the invention only, since different embodiments can be made without departing from this invention.

Example 1

A carboxy-hydroxy containing copolymer is prepared by charging into a two liter flask equipped with agitator, thermometer and reflux condenser, 535.0 grams of methyl isobutyl ketone. To this solvent is added 178.5 grams of propylene oxide, 221.6 grams of acrylic acid and 400.0 grams of styrene. The ratio of the three reactants to solvent used is 1.0 to 0.67. In addition to the 178.5 grams of propylene oxide, a 10 percent (17.9 gram) excess is used to compensate for any loss due to volatility; the unreacted portion being distilled off at the completion of the process. To this mixture, as catalysts, are added 16.0 grams of benzoyl peroxide, and 22.9 grams of a 35 percent solution of benzyl trimethyl ammonium hydroxide in methanol. The contents of the flask are heated to reflux temperature (75°–80° C.) at which time an exothermic reaction occurs and heating is discontinued. After the exotherm subsides, heat again is applied to maintain refluxing until an acid value of 2.7 is reached (approximately ten hours). The flask contents are further heated to about 117° C. while distilling off any unreacted propylene oxide. After removal of the excess propylene oxide, the reaction mixture is cooled to about 70° C. and poured into a suitable container. This process results in a 50–50 copolymer of styrene and hydroxy propyl acrylate by combination of these proportions; 22.3 parts by weight of propylene oxide, 27.7 parts by weight of acrylic acid and 50.0 parts by weight of styrene, a total of 100 parts for the three reactants. The copolymer solution thus prepared has a viscosity of Z (Gardner-Holdt) and a 58.5 percent solids content (two hours at 150° C.).

Example 2

A carboxy-hydroxy-containing copolymer is prepared according to Example 1 by combining 44.4 grams (11.1 parts by weight) of propylene oxide, 55.6 grams (13.9 parts by weight) of acrylic acid, and 300.0 grams (75.0 parts by weight) of styrene (parts by weight based on a total of 100 for the three reactants). 266.5 grams of xylene are used as a solvent. The ratio of the three reactants to solvent used is 1 to 0.67. As catalysts are added 4.0 grams of benzoyl peroxide and 5.7 grams of a 35 percent solution of benzyl trimethyl ammonium hydroxide in methanol. Refluxing of the mixture is continued until an acid value of 1.5 is reached (approximately 12½ hours). The 75–25 styrene-hydroxy propyl acrylate copolymer solution prepared has a solids content of 51.3 percent (two hours at 150° C.).

Example 3

A carboxy-hydroxy-containing copolymer is prepared according to Example 1 by combining 66.9 grams (22.3 parts by weight) of propylene oxide, 83.1 grams (27.7 parts by weight) of acrylic acid, 75.0 grams (25 parts by weight) of styrene and 75.0 grams (25 parts by weight) of methyl acrylate (parts by weight being based on a total of 100 parts for the four reactants), in the presence of 300.0 grams of xylene. The ratio of the four reactants to solvent used is one to one. To this mixture are added as catalyst three grams of benzoyl peroxide and 8.6 grams of a 35 percent solution of benzyl trimethyl ammonium hydroxide in methanol. In addition to the 66.9 grams of propylene oxide, a ten percent excess (6.7 grams) additional are used to compensate for any loss due to volatility; the unreacted portion being distilled off at the completion of the process. The reaction mixture is heated to reflux temperature at which time an exothermic reaction takes place and heating is discontinued. After the exotherm subsides, heat is again applied and refluxing is continued until an acid value of 3.7 is reached (approximately eleven hours). Unreacted propylene oxide is distilled off, the contents of the flask are cooled to around 70° C. and are then poured into a suitable container. This styrene-methyl acrylate-hydroxy propyl acrylate copolymer solution (25–25–50), prepared from the proportions above, has a solids content of 43.1 percent (two hours at 150° C.).

Example 4

According to the procedure outlined in Example 1, a carboxy-hydroxy-containing copolymer is prepared from 66.9 grams (22.3 parts by weight) of propylene oxide, 83.1 grams (27.7 parts by weight) of acrylic acid and 150.0 grams (50.0 parts by weight) of vinyl toluene (parts by weight being based on a total of 100 parts for the three reactants). As solvent 200.0 grams of xylene are added. The ratio of the three reactants to solvent used is one to 0.67. To this mixture are added as catalysts, 6.0 grams of benzoyl peroxide and 8.6 grams of a 35 percent solution of benzyl trimethyl ammonium hydroxide in methanol. In addition to the 66.9 grams of propylene oxide, 6.7 grams (ten percent excess) are added to allow for any loss due to volatility; the unreacted portion being distilled off at the completion of the process. The reaction mixture is refluxed until an acid value of 1.2 is obtained (approximately 10½ hours). The 50–50 vinyl toluene-hydroxypropyl acrylate copolymer solution thus prepared has a solids content of 46.2 percent (two hours at 150° C.).

Example 5

A carboxy-hydroxy containing copolymer is prepared according to Example 4 by combining in the presence of 100.0 grams of xylene and 100.0 grams of ethyl Cellosolve, 65.3 grams (22.3 parts by weight) of propylene oxide, 81.0 grams (27.7 parts by weight) of acrylic acid and 146.4 grams (50.0 parts by weight) of vinyl toluene (parts by weight being based on the total of 100 parts for the three reactants). The ratio of reactants to solvent used is one to 0.67. Benzoyl peroxide in the amount of 6.0 grams and triethanolamine in the amount of 18.0 grams are added as catalysts. The 50–50 vinyl toluene-hydroxypropyl acrylate copolymer solution resulting from the proportions above has an acid value of 3.7 (approximately ten hours refluxing), and a solids content of 43.9 percent (two hours at 150° C.).

Example 6

A carboxy-hydroxy containing copolymer is prepared according to Example 1, by combining in the presence of 267.0 grams of methyl isobutyl ketone, 80.4 grams (20.1 parts by weight) of propylene oxide, 119.6 grams (29.9 parts by weight) of methacrylic acid, and 200.0 grams (50.0 parts by weight) of vinyl toluene (parts by weight being based on a total of 100 parts for the three reactants). The ratio of the three reactants to solvent used is one to 0.67. To this mixture are added as catalysts, 8.0 grams of benzoyl peroxide and 6.7 grams of a 60 percent aqueous solution of benzyl trimethyl ammonium chloride. Combination of the proportions above result in a 50–50 vinyl toluene-hydroxypropyl methacrylate copolymer solution with an acid value of 9.6 (after approximately 8½ hours refluxing) and a solids content of 56.7 percent (two hours at 150° C.).

Example 7

According to the process outlined in Example 1, a carboxy-hydroxy containing copolymer is prepared in the presence of 200.0 grams of methyl isobutylketone by combining 112.2 grams (37.4 parts by weight) of butyl hydrogen maleate, 37.8 grams (12.6 parts by weight) of propylene oxide, and 150.0 grams (50.0 parts by weight) of methyl acrylate (parts by weight being based on the total of 100 parts for the three reactants). The ratio of the three reactants to solvent used is one to 0.67. Six grams of benzoyl peroxide and 2.5 grams of a 60 percent aqueous solution of benzyl trimethyl ammonium chloride are used as catalysts. The copolymer resulting from the combination of the proportions above is a 50–50 methyl acrylate-hydroxypropyl butyl maleate copolymer solution with an acid value of 12.9 (refluxing for approximately ten hours) and a solids content of 40.7 percent (two hours at 150° C.).

Example 8

According to the procedure outlined in Example 1, a carboxy-hydroxy containing copolymer is prepared by combining in the presence of 200.0 grams of methyl isobutyl ketone, 101.4 grams (33.8 parts by weight) of phenyl glycidyl ether (weight per epoxide=150), 48.6 grams (16.2 parts by weight) of acrylic acid, and 150.0 grams (50.0 parts by weight) of styrene (parts by weight being based on a total of 100 parts for the three reactants). The ratio of the three reactants to solvent used is one to 0.67. As catalysts, 6.0 grams of benzoyl peroxide and 5.0 grams of a 60 percent aqueous solution of benzyl trimethyl ammonium chloride are added. The mixture is refluxed until an acid value of 3.4 is reached (approximately eight hours). The above proportions result in a 50–50 styrene-acrylic acid ester of phenyl glycidyl ether copolymer solution, with a solids content of 55 percent (two hours at 150° C.).

Example 9

A carboxy-hydroxy containing copolymer is prepared by combining in a one liter flask fitted with a thermometer, condenser and agitator, in the presence of 200 grams of methyl isobutyl ketone; 97.5 grams (32.5 parts by weight) of butyl glycidyl ether (weight per epoxide =133), 52.5 grams (17.5 parts by weight) of acrylic acid and 150.0 grams (50.0 parts by weight) of vinyl toluene (parts by weight being based on a total of 100 parts for the three reactants). The ratio of the three reactants to solvents used is one to 0.67. As catalysts are added six grams of benzoyl peroxide and five grams of a 60 percent aqueous solution of benzyl trimethyl ammonium chloride. The mixture is heated to reflux temperature, at which time an exothermic reaction occurs and heating is discontinued. After the exotherm subsides, heat is again supplied and refluxing is maintained until an acid value of 3.8 is reached (approximately 5½ hours). The 50–50 vinyl toluene-acrylic ester of butyl glycidyl ether copolymer solution prepared from the proportions above has a solids content of 60 percent (two hours at 150° C.).

In accordance with this invention, it has been found that the combination of an aminoplast resin with a carboxyl containing hydroxyl copolymer, such as the copolymer-urea aldehyde composition disclosed in Serial Number 593,340, now U.S. Patent No. 3,002,959, and application Serial Number 117,830, filed June 19, 1961, yields compositions having outstanding properties. Such copolymer-aminoplast resin compositions lend themselves very readily to the formation of industrial finishes. They are excellent coatings for metal surfaces, such as for stoves, refrigerators, washers, driers, and other appliances as well as automobiles, toys, and the like.

Aminoplast resins, as contemplated herein, include alkylated condensates formed by the reaction of aminotriazines and amino-diazines with aldehydes. It is known that various amines and amides will condense in the presence of alcohols with aldehydes to form alkylated aldehyde-amine and aldehyde-amide condensates. Thus, urea, thiourea, and various substituted ureas and urea derivatives will react with aldehydes, such as formaldehyde to form alkylated condensates, e.g., methylol ureas, etc. Similarly, it is well known that melamines, such as melamine itself and benzoguanamine will react with aldehydes, particularly formaldehyde, to form melamine-aldehyde condensates. Various other amines and amides can similarly be reacted with formaldehyde, etc., to form alkylated condensates which are alkylated amine aldehyde or amide aldehyde resins or condensates. Alkylated condensates result when the amino aldehyde or amide aldehyde resin is prepared in the presence of alcohols such as methyl, ethyl, propyl, butyl, isobutyl, octyl and decyl alcohol, these solvents actually becoming a part of the resulting product. In general, alkylated urea or melamine aldehyde condensates of different degrees of condensation can be used so long as they are soluble in aromatic hydrocarbons or mixtures of these with other solvents. Alkylated melamine-aldehyde condensates, however, are the preferred aminoplast resins.

The proportions of the carboxy-containing hydroxyl copolymer and the aminoplast resin will depend on the desired properties of the coating which results on curing at a temperature of 80° C. to 150° C. It is usually preferred that the composition contain 5 to 50 percent aminoplast resin and about .2 to 4 percent acid, the remainder being a comonomer copolymerizable therewith. Based on the foregoing, this invention thus contemplates a heat hardenable coating composition especially for application to metal, based on a mixture of (1) 50 to 95 percent of a thermoplastic copolymer of (a) 0.2 to 4 percent acrylic acid, methacrylic acid, crotonic acid or half acid-esters of maleic and fumaric acids, (b) 1 to 71 percent of a hydroxy ester of an acid of group (a) and a monoepoxide such as 1,2-alkylene oxides, aryl 1,2-alkylene oxides, monoglycidyl ethers and monoglycidyl esters, each having not over 10 carbon atoms and (c) 25 to 95 percent, the total being 100 of an ethylenically unsaturated monomer copolymerized therewith; with (2) 5 to 50 percent of an aminoplast resin. In a specific embodiment, the invention includes a heat hardenable coating composition based on the mixture of (1) 50 to 95 percent thermoplastic copolymer of (a) 5 to 30 percent hydroxypropyl acrylate, methacrylate or crotonate, (b) 1 to 4 percent crotonic, acrylic or methacrylic acid and (c) 66 to 94 percent, the total being 100 of at least one other copolymerizable monoethylenically unsaturated monomer and (2) 5 to 50 percent of the aminoplast resin.

These coatings are exemplified further by the following preparations:

Example 10

| Material | Units | Parts by weight |
|---|---|---|
| Propylene oxide | 10.0 | 30.0 |
| Acrylic acid | 12.4 | 37.2 |
| Styrene | 77.6 | 232.8 |
| Benzoyl peroxide | | 6.0 |
| Xylene | | 120.0 |
| Methyl isobutyl ketone | | 180.0 |

In accordance with Example 1, the 30 parts of propylene oxide, 37.2 parts of acrylic acid, 232.8 parts of styrene, 6 parts of benzoyl peroxide, 120 parts of xylene and the 180 parts of methyl isobutyl ketone are heated with agitation to reflux (80° C. to 90° C.). At this temperature an exothermic reaction occurs and heating is discontinued. After the exotherm subsides heat is again applied to maintain refluxing (raising the temperature to 117° C. as reflux permits). After 10 hours of refluxing the acid value of the solution is 40.5. Accordingly, .3 gram of benzyl trimethyl ammonium acetate is added followed one and one-half hours later by another addition of .6 gram of benzyl trimethyl ammonium acetate. The solution is further heated until its acid value is 10.7. The final product, a styrene-hydroxy propyl acrylate-acrylic acid copolymer solution having a solids content of 47.9 percent, has an acid value of 22.3 (solids basis).

In a suitable container, 20 parts of the above copolymer solution (47.9 percent solids) and 1.8 parts of a urea-formaldehyde resin solution are blended and 3 mil films of this blend (Blend 10a) are drawn down on glass plates. The urea-formaldehyde resin solution used is a 60/30/10 butylated urea-formaldehyde resin/butanol/xylol solution. At curing schedules of 200° C. for 15 minutes and 200 C. for 30 minutes, hard, mar resistant, thermoset films are produced.

Four additional blends and films are prepared in the same manner as above. The reactants and quantities used and the proportions of the cured films are listed in the following table:

| Blend | Copolymer solution (parts) | Urea-formaldehyde resin solution (parts) | Curing temp., ° C. | Properties curing time, 15 min. |
|---|---|---|---|---|
| 10b | 20 | 4 | 200 | Tough, flexible, fair mar resistance. |
| 10c | 20 | 6.8 | 200 | Very tough and more flexible than Blend 10b, good mar resistance and adhesion. |
| 10d | 20 | 10.7 | 200 | Extremely tough and hard, very good adhesion, excellent mar resistance. |
| 10c | 20 | 16.0 | 200 | Fairly brittle, extremely hard, good adhesion, excellent mar resistance. |

Example 11

| Material | Units | Parts by weight |
|---|---|---|
| Propylene oxide (10 percent excess by weight) | 10.9 | 33.0 |
| Acrylic acid | 12.3 | 37.2 |
| Styrene | 76.8 | 232.8 |
| Benzoyl peroxide | | 6.0 |
| Xylene | | 120.0 |
| Methyl isobutyl ketone | | 180.0 |
| Benzyl trimethyl ammonium acetate | | 3.0 |

As in the procedure of Example 10, the above materials in the amounts shown are heated to reflux (80° C. to 90° C.), at which temperature an exothermic reaction occurs. After the exotherm subsides the reaction mixture is again heated to maintain refluxing (raising the temperature to 122° C. as reflux permits) until an acid value (solution) of 2.6 is reached (about 9 hours). The resulting copolymer solution at a solids content of 44.8 percent has an acid value of 5.8 (solids basis). Blends are made of the above 44.8 percent solids copolymer solution with the 60 percent solids urea-formaldehyde resin solution described in Example 10 in the same way as the blends of Example 10. Films are also prepared from the blends. The following table lists the quantities of the reactants used, the curing schedule of the films, and a comparison of the properties of the cured films.

| Blend | Copolymer solution (parts) | Urea-formaldehyde resin solution (parts) | Curing temp., ° C. | Curing time* | Properties |
|---|---|---|---|---|---|
| 11a | 30 | 4 | 200 | 15 | Brittle. |
| 11b | 30 | 5.6 | 200 | 15 | Less brittle than 11a, fair mar resistance. |
| 11c | 30 | 9.6 | 200 | 15 | Very hard, good adhesion and good mar resistance. |
| 11d | 30 | 15 | 200 | 15 | Tough, hard, very good mar resistance, most flexible of the four. |

*Minutes.

Six additional blends and films are prepared in the same way as above. However, these blends have a morpholine salt of para-toluene sulfonic acid added to them as a catalyst. The following table lists the quantities of the reactants used, the curing schedule of the films, and a comparison of the properties of the cured films.

| Blend | Copolymer solution (parts) [1] | Urea-formaldehyde resin solution (parts) [2] | Catalyst (25 percent solution in ethanol) (parts) | Curing temp., ° C. | Curing times [3] | Properties |
|---|---|---|---|---|---|---|
| 11e | 30 | 15 | .9 | 150 | 30 | Mar resistance better than Blend 11d, brittle. |
| 11f [1] | 30 | 9.6 | .8 | 150 | 30 | Good hardness, flexibility and mar resistance. |
| 11f [2] | | | | 200 | 20 | Less mar resistance and less flexibility than Blend 11f [1]. |
| 11g [1] | 30 | 5.6 | .7 | 150 | 30 | Good mar resistance, more flexible than Blend 11f.[1] |
| 11g [2] | | | | 200 | 20 | Less mar resistance flexibility than Blend 11f.[1] |
| 11h | 30 | 9.6 | 1.6 | 150 | 30 | Good mar resistance, less flexible than Blend 11g.[1] |
| 11i | 30 | 5.6 | 1.4 | 150 | 30 | Poor to fair mar resistance. |
| 11j | 30 | 9.6 | [4] .27 | 150 | 30 | Very much like blend 11c. |

[1] 44.8 percent solution. [2] 60 percent solution. [3] Minutes. [4] Benzyl trimethyl ammonium acetate.

Example 12

| Material | Units | Parts by weight |
|---|---|---|
| Propylene oxide | 24.1 | 74.3 |
| Acrylic acid | 27.0 | 83.1 |
| Styrene | 48.9 | 150.0 |
| Benzoyl peroxide | | 6.0 |
| Xylene | | 120.0 |
| Methy isobutyl ketone | | 180.0 |
| Benzyl trimethyl ammonium acetate | | 3.0 |

Following Example 10, the above materials in the amounts shown are heated to reflux (80° C. to 90° C.), at which temperature an exothermic reaction occurs. After the exotherm subsides, heat is applied to the flask contents to maintain refluxing (raising the temperature to 126° C. as reflux permits) until an acid value (solution) of 14.7 is reached (about 13 hours). At the end of this time, 25.8 additional parts of propylene oxide are added to the flask contents and the reaction mixture is heated to 126° C. over a period of six and one-half hours, distilling off any excess propylene oxide at the end of this period. The resulting styrene/hydroxypropylacrylate/acrylic acid copolymer solution having a solids content of 47.8 percent, has an acid value on solids basis of 30.7.

Blends are made of the above copolymer solution with the urea-formaldehyde resin solution described in Example 10 and a morpholine salt of para-toluene sulfonic acid as a catalyst in accordance with the catalyzed blends of Example 11. In addition, 10 parts of methyl isobutyl ketone are incorporated in three of the blends. The following table lists the quantities of the reactants used, the curing schedule and a comparison of the properties of the cured films.

| Blend | Copolymer solution (47.8 percent solids) (parts by weight) | Urea-formaldehyde resin solution (parts by weight)* | Catalyst (parts by weight) | Methyl isobutyl ketone (parts by weight) | Curing temp., ° C. | Curing time (min.) | Properties |
|---|---|---|---|---|---|---|---|
| 12a | 30 | 6 | .7 | 10 | 150 | 30 | More flexible than Example 11 cures, good mar resistance. |
| 12b | 30 | 10.3 | .8 | | 150 | 30 | Brittle, but very good mar resistance. |
| 12c | 30 | 3.6 | .7 | 10 | 150 | 30 | Good toughness, poor mar resistance. |
| 12d | 30 | 2.7 | .7 | 10 | 150 | 30 | Slightly inferior to Blend 12c cure in toughness and mar resistance. |

*60 percent solution.

Example 13

In a twelve liter, three neck, round bottom flask equipped with an agitator, thermometer, dropping funnel and reflux condenser, 3632.1 parts xylene and 682.4 parts butanol are heated to reflux. To this hot solvent over a period of 1½ hours, 1104.8 parts of methyl methacrylate, 1121.6 parts of butyl methacrylate, 426.7 parts of butyl acrylate, 468.8 parts of ethyl acrylate, 375.0 parts of methacrylic acid and 37.5 parts of benzoyl peroxide are added. The mixture is heated at the reflux temperature, 265° F., for two hours. The reaction product is then cooled to 180° F. and 21.2 parts of a 40-percent solution of benzyl trimethyl ammonium methoxide in methanol are added. Over a period of 1½ hours, 253 parts of propylene oxide are added to the flask contents. The temperature is again raised to reflux and refluxing is continued until a 98 percent conversion to copolymer is obtained. The resulting copolymer solution (copolymer 1), at 45 percent resin solids has a viscosity of J and an acid value of 13.8 (solids basis). The viscosity of the copolymer solution, when reduced to 40 percent resin solids with xylene is G.

To make as pastel blue, metallic automobile enamel using the foregoing copolymer, one part of a pigment paste, previously prepared by mixing the solution of the copolymer and phthalocyanine blue in a sand grind mill in a ratio of four parts copolymer (based on solids) to one part phthalocyanine blue, is stirred with an additional 62.25 parts, based on solids, of the copolymer, employed as a 45-percent solution. While this mixture is being stirred, 16.75 parts of an isobutylated melamine-formaldehyde resin solution is added containing 50 percent resin in isobutyl alcohol. In addition, 6.46 parts of a para-toluene sulphonamide-modified melamine-formaldehyde resin solution is added containing 66 percent resin in xylene. Stirring is continued and 6.93 parts acetone and 1.73 parts xylene are added. This mixture is then stirred until a smooth enamel forms. The enamel, when applied to an automobile body and baked at 250° F. has excellent film properties.

Example 14

In a three neck, round bottom flask equipped with an agitator, thermometer, dropping funnel and reflux condenser, 1050 parts of xylene are heated to reflux. To this hot solvent the first of two monomer additions is made consisting of 270 parts of methyl methacrylate, 45 parts of methacrylic acid, 180 parts of styrene and 75 parts of cumene hydroperoxide. The temperature is heated to the reflux temperature of 262° F., and at this temperature, the second monomer addition is made consisting of 469 parts of methyl methacrylate, 105 parts of methacrylic acid, 330 parts of styrene and 30 parts of cumene hydroperoxide. The flask contents are permitted to reflux for one hour and 15 minutes and then cooled to 190° F. At this temperature, 8.5 parts of benzyl trimethyl ammonium methoxide (as a 40-percent solution), are added and then, over a thirty-minute period, 101 parts of propylene oxide are also added. The composition is again heated to the reflux temperature and held at this temperature until a 98 percent conversion to copolymer is obtained. The resulting composition is reduced to 50 percent resin solids with butanol. This 50 percent resin solids composition has a viscosity of X–Y and an acid value of 14 (solids basis). The viscosity of the copolymer solution when reduced to 40 percent resin solids is I–J.

By the pigmentation procedure described in connection with Example 13, a solid white enamel is made from this copolymer solution. A sand grind is made from 21.07 parts of titanium dioxide, 4.26 parts of xylene and 2.67 parts of the copolymer solution (based on solids). This grind is then mixed with another pigment paste made from 42 parts (based on solids) of the copolymer solution, 18.02 parts (based on solids) of a melamine formaldehyde resin made in normal butyl alcohol and having a viscosity of G–K at 50 percent solids, 3 parts of Solvesso 100, an aromatic petroleum hydrocarbon, 4 parts of toluene, 2 parts of methyl ethyl ketone and .88 part of butyl Cellosolve. This mixture is stirred until a smooth enamel results, applied to an automobile body and baked for 30 minutes at 250° F. The resulting finish has very good properties.

The foregoing copolymer solution is blended on a solids basis with alkylated aminoplast resins in a ratio of 70 parts copolymer (solids basis) to 30 parts of each of the following resins: melamine-formaldehyde resin made in butyl alcohol and paratoluene sulfonamide (66 percent resin solids), benzoguanamine-formaldehyde resin made in butyl alcohol (60 percent resin solids) butylated melamine-formaldehyde resin (55 percent resin solids), isobutylated melamine-formaldehyde resin (55 percent resin solids), butylated urea-formaldehyde resin (50 percent resin solids). Films made from all of these blends, when compared with one fatty acid modified alkyd resin containing 22.8 percent lauric acid and another one modified with 40 percent soya acids, yield equivalent solvent resistance properties and superior resistance to lipstick and mustard staining.

Example 15

In accordance with Example 13, a copolymer solution is prepared in xylene using the following: 46.90 parts of ethyl acrylate, 37.35 parts of styrene, 9.40 parts of methacrylic acid and 6.35 parts of propylene oxide. The resulting copolymer solution (54.5 percent resin solids) has a viscosity of $Z_2$–$Z_3$ and an acid value of 12.6 (solids basis).

This copolymer solution is mixed with a paratoluene sulfonamide-modified butylated melamine-formaldehyde resin in a ratio of 70 parts copolymer solids to 30 parts resin solids. The sulfonamide-modified butylated melamine-formaldehyde resin solution at 66 percent solids in 34 percent xylene has a specific gravity of 1.06 and a viscosity of Z–$Z_4$. The film forming mixture of the copolymer solution with the melamine-formaldehyde resin solution is applied in the form of a film to steel panels previously coated with iron phosphate (Bonderite 1000). Films baked 30 minutes at 250° F. have a pencil hardness of HB, pass the conical mandrel test but fail a 10-inch-pound bump test. Films baked 30 minutes at 300° F. have a pencil hardness of F and pass both the conical mandrel and 10-inch-pound bump tests.

Example 16

Following the procedure of Example 13, a copolymer solution is prepared in Solvesso 100 [1] using the following: 33.3 parts of styrene, 41.82 parts of ethyl acrylate, 14.88 parts of methacrylic acid and 10 parts of propylene oxide. The resulting copolymer solution (55 percent resin solids) has a viscosity of $Z_3$ and an acid value of 13.2 (solids basis).

This copolymer solution is mixed in a 70 copolymer solids, 30 resin solids ratio with a butylated melamine formaldehyde resin solution, applied to Bonderite 1000 steel panels and baked for 30 minutes at 300° F. The resulting slightly hazy film has a pencil hardness of 2H and good mustard, catsup, lipstick, solvent, and boiling water resistance properties. When mixed in the same ratio with a butylated benzoguanamine-formaldehyde resin solution, the baked film has good resistance properties and a pencil hardness of F. The butylated benzoguanamine-formaldehyde resin solution at 60 percent solids in 20 percent butanol and 20 percent xylene has a specific gravity of 1.04 and a viscosity of G–K.

Example 17

To a suitable reaction flask equipped with a mechanical stirrer, thermometer, condenser and dropping funnel are added 50 parts of xylene and 50 parts of n-butanol. To the dropping funnel are added 147 parts of styrene, 90 parts of butyl acrylate, 45 parts of hydroxypropyl methacrylate, 18 parts of methacrylic acid and 6 parts of benzoyl peroxide. Heat is applied to the flask raising the temperature of the solvents to 90° C. Addition of the monomer-catalysts solution is begun and is continued for 3 hours and 5 minutes while the temperature of the reactants is allowed to rise to 120° C. Heating is continued at 120° C. for 2 hours and 12 minutes. 3 parts of benzoyl peroxide are added to the reactants and heating is continued at 115° C. to 120° C. for 3 hours and 14 minutes. After the addition of 50 parts of xylene and 50 parts of n-butanol, the resulting clear polymer solution has a viscosity of $Z_6$+ at 62.2 percent solids.

To 22.5 parts of the polymer solution are added 10 parts of a butylated melamine-formaldehyde resin (at 60 percent solids in n-butanol and xylene) and 7.5 parts of xylene. Films are prepared on glass using a 3 mil draw down blade. After a 30 minute bake at 150° C., well cured clear films are obtained with good mar resistance, adhesion and gloss.

Example 18

To a suitable reaction flask equipped with a mechanical stirrer, thermometer, condenser and dropping funnel are added 50 parts of xylene and 50 parts of n-butanol. To the dropping funnel are added 156 parts of vinyl acetate, 90 parts of butyl acrylate, 9 parts of methacrylic acid, 45 parts of hydroxypropyl methacrylate, and 6 parts of benzoyl peroxide catalyst. Heat is applied raising the temperature in the flask to 90° C. The addition of the monomer-catalyst solution is begun and is continued over a 4-hour period while holding the temperature at 95° C. to 100° C. Heating is continued for two hours with the temperature slowly rising to 107° C. Additional catalyst, 3 parts benzoyl peroxide, and solvents, 50 parts xylene and 50 parts n-butanol, are added to the flask. Heating is continued at 105° C. to 114° C. for 2.5 hours, The resulting clear product has a Gardner-Holdt viscosity of U to V at 58.1 percent solids. Conversion of monomers to polymers is 97 percent as calculated from the solids determination.

A blend is prepared from 24.1 parts of the copolymer solution, 10 parts of a butylated melamine-formaldehyde resin (at 60 percent solids in xylene and n-butanol) and 5.9 parts of xylene. Films are prepared on glass using a 3 mil draw down blade. After a 30 minute bake at 150° C., well-cured films are obtained having excellent flexibility, adhesion, mar resistance and gloss.

Example 19

Using the same procedure as described in Example 17, a copolymer is prepared from 96 parts styrene, 150 parts ethylacrylate, 45 parts hydroxypropyl methacrylate and 9 parts methacrylic acid dissolved in 100 parts of xylene and 100 parts of n-butanol using 9 parts of benzoyl peroxide catalyst. The copolymer solution has a viscosity of Z at 61.4 percent solids.

To 22.9 parts of the copolymer solution are added 12 parts of an isobutylated melamine-formaldehyde resin (at 50 percent solids in isobutanol) and 5.1 parts of xylene. Films on glass are prepared from this blend using a 3 mil draw down blade. After a 30 minute bake at 150° C.,

[1] Solvesso 100: A 95 percent aromatic petroleum hydrocarbon having a boiling range of 315° F. to 355° F. with 90 percent boiling between 315° F. and 338° F.

clear, hard, well-cured films are obtained having excellent mare resistance and good adhesion, flexibility and gloss.

Example 20

To a suitable reaction flask equipped with a mechanical stirrer, thermometer, condenser and dropping funnel are added 128 parts of xylene. To the dropping funnel are added 150 parts of ethyl acrylate, 81 parts of styrene, 60 parts of butyl, hydroxypropyl maleate, 9 parts of methacrylic acid and 12 parts of di-tertiary butyl peroxide. Heat is applied raising the temperature of the xylene in the flask to 130° C. The addition of the monomer-catalyst solution is begun and is continued for 5 hours and 7 minutes while holding the temperature at 124° C. to 130° C. The temperature of the reactants is then held at 124° C. to 136° C. for 6 hours, after which heating period, 100 percent conversion of monomers to copolymers is obtained as indicated by solids determination. The resulting clear solution has a Gardner-Holdt viscosity of $Z_6+$.

22.9 parts of the copolymer solution, 8.0 parts of an isobutylated melamine-formaldehyde resin (at 50 percent solids in isobutanol) and 9.9 parts of xylene are blended together. Films are prepared on glass plates using a 3 mil draw down blade. After baking for 30 minutes at 150° C., the clear films exhibit very good mar resistance, gloss, toughness, adhesion and flexibility. These films are unaffected after 8 weeks' immersion in 5 percent NaOH solution.

Example 21

Using the same procedure as described in Example 17, a copolymer is prepared from 186 parts of vinyl acetate, 60 parts of dibutyl fumarate, 45 parts of hydroxypropyl crotonate and 9 parts of acrylic acid in 50 parts of xylene and 50 parts of n-butanol using 9 parts of benzoyl peroxide catalyst. The copolymer solution has a viscosity of $Z_5$ at 70.9 percent solids.

To 19.8 parts of the copolymer solution are blended 10 parts of a butylated urea-formaldehyde resin (dissolved at 60 percent solids in a mixture of xylene and n-butanol) and 10.2 parts of xylene. Films are prepared on glass using a 3 mil draw down blade. After a 30-minute bake at 150° C., films are clear and glossy.

Additional films are prepared in the same manner from a blend of 19.8 parts of the copolymer solution, 10.2 parts of xylene and 10 parts of a butylated melamine-formaldehyde resin (dissolved at 60 percent solids in a mixture of xylene and n-butanol). After a 30-minute bake at 150° C., the films are clear and glossy.

Example 22

To 22.9 parts of the copolymer solution of Example 20 are added 8 parts of a polyisocyanate (adduct of 3 mols tolylene diisocyante, 1 mol trimethylol propane and 3 mols phenol—isocyanate equivalent weight=335) at 50% solids in ethylene glycol monoethyl ether acetate (80 parts copolymer to 20 parts diisocyanate compound on solid basis). After addition of 24.1 parts ethylene glycol monoethyl ether acetate, 3 mil films are prepared on glass. Well cured films with very good adhesion to the glass are obtained after 30 minutes at 180° C.

Another blend is prepared as described above wherein the ratio of copolymer to diisocyanate compound on a solids basis is 70 to 30. Films, prepared and baked as described above, are well cured and have very good flexibility and gloss and adhesion to glass.

Example 23

A copolymer is prepared from 147 parts of vinyl acetate, 90 parts of butyl acrylate, 45 parts of hydroxypropyl crotonate and 18 parts of methacrylic acid in 50 parts of xylene and 50 parts of n-butanol using 9 parts of benzoyl peroxide catalyst. The copolymer solution at 68.1% solids has a Gardner-Holdt viscosity of $Z_3$ to $Z_4$.

To 26 parts of the copolymer solution are added 2.4 parts of the diglycidyl ether of bisphenol A (epoxide equivalent weight=190), 11.6 parts of xylene and 0.2 part of a 60% aqueous solution of benzyl trimethyl ammonium chloride. Films are prepared on glass using a 3 mil draw down blade. After a 30-minute bake at 150° C., well cured clear glossy films are obtained having excellent flexibility and adhesion to glass.

To 26 parts of the copolymer solution are added 2.4 parts of the diglycidyl ether of bisphenol A (epoxide equivalent weight=190), 0.2 part of a 60% aqueous solution of benzyl trimethyl ammonium chloride and 10 parts of an isobutylated melamine formaldehyde resin at 50% solids in isobutanol. After the addition of 11.6 parts of xylene, 3 mil films are prepared on glass and are baked at 150° C. for 30 minutes. Clear, well cured films having very good mar resistance, excellent adhesion, and excellent flexibility are obtained.

To 22.8 parts of the copolymer solution are added 9 parts of a polyisocyanate (adduct of 3 mols tolylene diisocyanate, 1 mol trimethylol propane and 3 mols phenol—isocyanate equivalent weight=335) at 50% solids in ethylene glycol monoethyl ether acetate. After the addition of 8.2 parts of ethylene glycol monoethyl ether acetate, 3 mil films are prepared on glass and are baked at 180° C. for 30 minutes. Well cured films having very good mar resistance and excellent flexibility, adhesion and toughness are obtained.

It is to be understood that the foregoing detailed description is given merely by way of illustration and that many variations may be made therein without departing from the spirit of the invention.

The embodiments of the invention in which an exclusive property or privilege is claimed are defined as follows:

[1. A copolymer of (a) 0.15 to 4.0 percent by weight of an unsaturated aliphatic acid selected from at least one member of the group consisting of acrylic acid, methacrylic acid, crotonic acid and half acid-esters of maleic and fumaric acids formed with saturated alcohols of from 1 to 10 carbon atoms, (b) 21 to 94.8 percent of at least one different ethylenically unsaturated monomer copolymerizable with the unsaturated acid, and (c) 5 to 75 percent, the total being 100 percent, of a beta hydroxy alkyl ester of an unsaturated aliphatic acid selected from at least one member of the group consisting of acrylic acid, methacrylic acid, crotonic acid, and half acid-esters of maleic and fumaric acids formed with saturated alcohols of from 1 to 10 carbon atoms, said copolymer having an acid value of from about 1–50.]

[2. The copolymer of claim 1 wherein (a) is acrylic acid, (b) is a mixture of styrene and butyl acrylate, and (c) is hydroxy propyl acrylate.]

[3. The copolymer of claim 1 wherein (a) is methacrylic acid, (b) is a mixture of methyl methacrylate and ethyl acrylate and (c) is hydroxy propyl methacrylate.]

[4. The copolymer of claim 1 wherein (a) is butyl hydrogen maleate, (b) is methyl acrylate, and (c) is hydroxy propyl butyl maleate.].

[5. The copolymer of claim 1 wherein (a) is acrylic acid, (b) is styrene, and (c) is 3-phenoxy, 2-hydroxy propyl acrylate.]

[6. The copolymer of claim 1 wherein (a) is acrylic acid, (b) is vinyl toluene, and (c) is 3-butoxy, 2-hydroxy propyl acrylate.]

[7. A composition comprising the copolymer of claim 1 in combination with a crosslinking agent.]

[8. The composition of claim 7 wherein the crosslinking agent is a diisocyanate.]

*9. A copolymer of (a) 0.15 to 4.0 percent by weight of an unsaturated aliphatic acid selected from at least one member of the group consisting of acrylic acid, methacrylic acid, crotonic acid and half acid-esters of maleic and fumaric acids formed with saturated alcohols of from 1 to 10 carbon atoms, (b) 25 to 95 percent of at least one different ethylenically unsaturated monomer copolymeriz-*

*able with the unsaturated acid, and (c) 4.8 to 74.8 percent, the total being 100 percent, of a beta hydroxy alkyl ester of an unsaturated aliphatic acid selected from at least one member of the group consisting of acrylic acid, methacrylic acid, crotonic acid, and half acid-esters of maleic and fumaric acids formed with saturated alcohols of from 1 to 10 carbon atoms, said copolymer having an acid value of from about 1–31.*

*10. A copolymer of (a) 0.15 to 4.0 percent by weight of an unsaturated aliphatic acid selected from at least one member of the group consisting of acrylic acid, methacrylic acid, crotonic acid and half acid-esters of maleic and fumaric acids formed with saturated alcohols of from 1 to 10 carbon atoms, (b) 25 to 94.8 percent of at least one different ethylenically unsaturated monomer copolymerizable with the unsaturated acid, and (c) 5 to 74.8 percent, the total being 100 percent, of a beta hydroxy alkyl ester of an unsaturated aliphatic acid selected from at least one member of the group consisting of acrylic acid, methacrylic acid, crotonic acid, and half acid-esters of maleic and fumaric acids formed with saturated alcohols of from 1 to 10 carbon atoms, said copolymer having an acid value of from about 1–31.*

References Cited

The following references, cited by the Examiner, are of record in the patented file of this patent or the original patent.

UNITED STATES PATENTS

| | | | |
|---|---|---|---|
| 2,129,722 | 9/1938 | Woodhouse. | |
| 2,290,600 | 7/1942 | Neher et al. | |
| 2,328,922 | 9/1943 | Neher et al. | |
| 2,381,063 | 8/1945 | Kung. | |
| 2,530,983 | 11/1950 | Minter. | |
| 2,607,761 | 8/1952 | Seymour. | |
| 2,681,897 | 6/1954 | Frazier et al. | 260—86.1 |
| 2,729,615 | 1/1956 | Bloom et al. | |
| 2,777,832 | 1/1957 | Mallison. | |
| 2,787,561 | 4/1957 | Sander. | |
| 2,819,237 | 1/1958 | Daniel. | |
| 2,842,519 | 7/1958 | Ripley-Duggan. | |
| 2,853,462 | 9/1958 | Gaylord. | |
| 2,892,790 | 6/1959 | Stuart et al. | |
| 2,899,404 | 8/1959 | Chapin et al. | |
| 2,939,854 | 6/1960 | Christenson. | |
| 2,957,853 | 10/1960 | Chapin et al. | |
| 2,993,032 | 7/1961 | Stuart et al. | |
| 3,028,367 | 4/1962 | O'Brien | 260—77.5 |
| 3,082,184 | 3/1963 | Falgiatore et al. | 260—851 |
| 3,002,959 | 10/1961 | Hicks | 260—88.1 |
| 3,156,740 | 11/1964 | Bossell | 260—855 |

FOREIGN PATENTS

| | | |
|---|---|---|
| 1,061,952 | 4/1954 | France. |
| 1,038,754 | 9/1958 | Germany. |

JOHN C. BLEUTGE, Primary Examiner

U.S. Cl. X.R.

117—132A, 132BF, 161KP, 161L, 161LN, 161UT, 161UC, 161ZB; 260—31.9R, 31.4EP, 32.8R, 32.8EP, 33.2R, 33.2EP, 33.4R, 33.4EP, 33.3UR, 33.6EP, 33.6UB, 33.6UA, 47UP, 77.5CR, 78.3UA, 78.5R, 78.5B, 78.5T, 80.75, 80.8, 80.81, 88.1PC, 831, 837R, 851, 856 859R

UNITED STATES PATENT OFFICE

CERTIFICATE OF CORRECTION

Patent No. RE 27,151 Dated June 29, 1971

Inventor(s) HICKS, DARRELL D.

It is certified that error appears in the above-identified patent and that said Letters Patent are hereby corrected as shown below:
Add the following claims:

11. A composition comprising the copolymer of claim 9 in combination with a crosslinking agent.

12. A composition comprising the copolymer of claim 10 in combination with a crosslinking agent.

13. The copolymer of claim 9 wherein (a) is acrylic acid, (b) is a mixture of styrene and butyl acrylate, and (c) is hydroxy propyl acrylate.

14. The copolymer of claim 9 wherein (a) is methacrylic acid, (b) is a mixture of methyl methacrylate and ethyl acrylate, and (c) is hydroxy propyl methacrylate.

15. The copolymer of claim 9 wherein (a) is butyl hydrogen maleate, (b) is methyl acrylate, and (c) is hydroxy propyl butyl maleate.

16. The copolymer of claim 9 wherein (a) is acrylic acid, (b) is styrene, and (c) is 3-phenoxy, 2-hydroxy propyl acrylate.

17. The copolymer of claim 9 wherein (a) is acrylic acid, (b) is vinyl toluene, and (c) is 3-butoxy, 2-hydroxy propyl acrylate.

18. The composition of claim 11 wherein the crosslinking agent is a diisocyanate.

Signed and sealed this 21st day of September 1971.

(seal0
Attest:

EDWARD M.FLETCHER,JR.
Attesting Officer

ROBERT GOTTSCHALK
Acting Commissioner of Patents